United States Patent
John et al.

(10) Patent No.: US 10,293,949 B2
(45) Date of Patent: May 21, 2019

(54) INFLATION SYSTEM PRESSURE REGULATOR WITH LEAKAGE VENT

(71) Applicant: GOODRICH CORPORATION, Charlotte, NC (US)

(72) Inventors: Poly Puthur John, Karnataka (IN); S. Shyam Sundar Iyer, Karnataka (IN); Manjunatha Prabhudevaiah, Karnataka (IN); Tamizhannban Aruldasan Koilpillai, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 215 days.

(21) Appl. No.: 15/067,815

(22) Filed: Mar. 11, 2016

(65) Prior Publication Data

US 2017/0203849 A1 Jul. 20, 2017

(30) Foreign Application Priority Data

Jan. 20, 2016 (IN) .............................. 201611002161

(51) Int. Cl.
*B64D 25/14* (2006.01)

(52) U.S. Cl.
CPC .................................... *B64D 25/14* (2013.01)

(58) Field of Classification Search
CPC . B63C 2009/042; B63C 9/24; F25B 41/0692; F25B 41/062; F16K 3/26; F16K 17/34; F16K 47/04; F16K 1/305; F16K 1/307; F16K 1/306; F16K 15/207; F17C 13/04; G05D 16/00–16/2093; G05D 18/20; B64D 25/14; B64D 25/16; B64D 17/16

USPC ........................................ 137/613, 505–505.4
See application file for complete search history.

(56) References Cited

U.S. PATENT DOCUMENTS

| | | | | |
|---|---|---|---|---|
| 2,335,824 A | * | 11/1943 | Dillman | G05D 23/128 137/505.12 |
| 3,108,610 A | * | 10/1963 | De See | F16K 17/196 137/493 |
| 4,445,532 A | * | 5/1984 | Mitchell | F16K 1/38 137/495 |
| 4,549,870 A | * | 10/1985 | Wass | B63C 9/24 251/74 |
| 4,566,862 A | * | 1/1986 | Halavais | F04F 5/48 417/174 |
| 4,595,374 A | | 6/1986 | Wass | |
| 4,619,285 A | | 10/1986 | Piet | |
| 4,794,950 A | * | 1/1989 | Gratzmuller | F16K 11/105 137/596.18 |
| 5,921,832 A | | 7/1999 | Thiermann | |

(Continued)

*Primary Examiner* — Richard R. Green
*Assistant Examiner* — Vicente Rodriguez
(74) *Attorney, Agent, or Firm* — Cantor Colburn LLP

(57) ABSTRACT

A control valve includes a slide valve having a slide movable within a channel between a first position and a second position. When the slide is in the second position, the channel is arranged in fluid communication with an outlet line. A pressure regulator is arranged upstream from and in fluid communication with the slide valve and is operably coupled to a fluid source. The pressure regulator includes a flow metering element movable between an open position and a closed position to regulate a flow of fluid and pressure through the control valve in response to a pressure variations within the downstream slide valve.

18 Claims, 4 Drawing Sheets

(56) References Cited

U.S. PATENT DOCUMENTS

| | | | |
|---|---|---|---|
| 6,240,951 B1 | 6/2001 | Yori | |
| 6,413,132 B1 * | 7/2002 | Swanson | B63C 9/24 |
| | | | 251/294 |
| 6,431,197 B2 | 8/2002 | Hintzman et al. | |
| 6,467,751 B1 * | 10/2002 | Korpanty | F16K 15/20 |
| | | | 251/294 |
| 2004/0113017 A1 * | 6/2004 | Baderspach | B64C 1/1407 |
| | | | 244/129.5 |
| 2004/0195457 A1 * | 10/2004 | Baker | B64D 25/14 |
| | | | 244/137.2 |

* cited by examiner

INFLATION SYSTEM PRESSURE REGULATOR WITH LEAKAGE VENT

CROSS REFERENCE TO RELATED APPLICATIONS

The present invention claims priority under 35 U.S.C. § 119 to Indian Application No. 20161102161 filed Jan. 20, 2016, the entire contents of which are incorporated herein by reference.

BACKGROUND

Exemplary embodiments of this disclosure relates to emergency evacuation equipment for an aircraft, and in particular to an inflation device for inflating an inflatable aircraft evacuation slide or other inflatable device.

The requirement for reliably evacuating airline passengers in the event of emergency is well-known. Emergencies at take-off and landing often demand swift removal of the passengers from the aircraft because of the potential of injuries from fire, explosion, or sinking in water. A conventional method of quickly evacuating a large number of passengers from an aircraft is to provide multiple emergency exits, each of which is equipped with an inflatable evacuation slide.

Typical emergency evacuation slide systems comprise an inflatable evacuation slide that is stored in a folded, uninflated state together with a source of inflation gas. The source of inflation gas typically comprises a gas generator, stored compressed gas, or a combination thereof. Pyrotechnic gas generators have an advantage in that they are small, lightweight, and produce a high volume of gas, however, the high temperature gas produced by a gas generator alone can cause numerous problems including sagging of the evacuation slide as the inflation gas cools and, in some cases melting or scorching of the fabric out of which the inflation slide is fabricated. Use of stored compressed gas by itself, although simple, implicates a weight penalty that must be paid for carrying a pressure vessel having sufficient capacity (in terms of volume and pressure) to inflate the evacuation slide over the wide operational temperature range specified for such slides. Additionally, where only a compressed gas is used to inflate the evacuation slide, a large drop in temperature occurs as the gases expand, often causing ice to form, which can block the flow of gas.

Modern evacuation slide inflation systems typically comprise a pressure vessel containing a stored pressurized gas, either alone or in combination with a pyrotechnic gas generator, used to supply the source gas for inflation of the emergency evacuation slide. The gas source is connected to a system having a one or more upstream high pressure flow valves and a downstream pressure regulating valve. The position of a metering element of the pressure regulating valve is influenced by both a biasing force and the pressure of the incoming flow. Because downstream pressure variation does not affect the position of the metering element, the metering element is not form a fluid tight seal when closed. Further, conventional systems may be susceptible to failures of a mechanical trigger or of the pressure regulating valve, which may result in a high pressure flow being provided to the inflatable slide.

BRIEF DESCRIPTION OF THE INVENTION

According to one embodiment of the invention, a control valve includes a slide valve having a slide movable within a channel between a first position and a second position. When the slide is in the second position, the channel is arranged in fluid communication with an outlet line. A pressure regulator is arranged upstream from and in fluid communication with the slide valve and is operably coupled to a fluid source. The pressure regulator includes a flow metering element movable between an open position and a closed position to regulate a flow of fluid and pressure through the control valve in response to a pressure variations within the downstream slide valve.

According to another embodiment of the invention, an aircraft evacuation slide inflation system includes an inflatable evacuation slide stored in an undeployed position, a source of inflation gas for inflating said inflatable evacuation slide and a control valve. The control valve includes a slide valve having a slide movable within a channel between a first position and a second position. When the slide is in the second position, the channel is arranged in fluid communication with an outlet line. A pressure regulator is arranged upstream from and in fluid communication with the slide valve and is operably coupled to a fluid source. The pressure regulator includes a flow metering element movable between an open position and a closed position to regulate a flow of fluid and pressure through the control valve in response to a pressure variations within the downstream slide valve.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
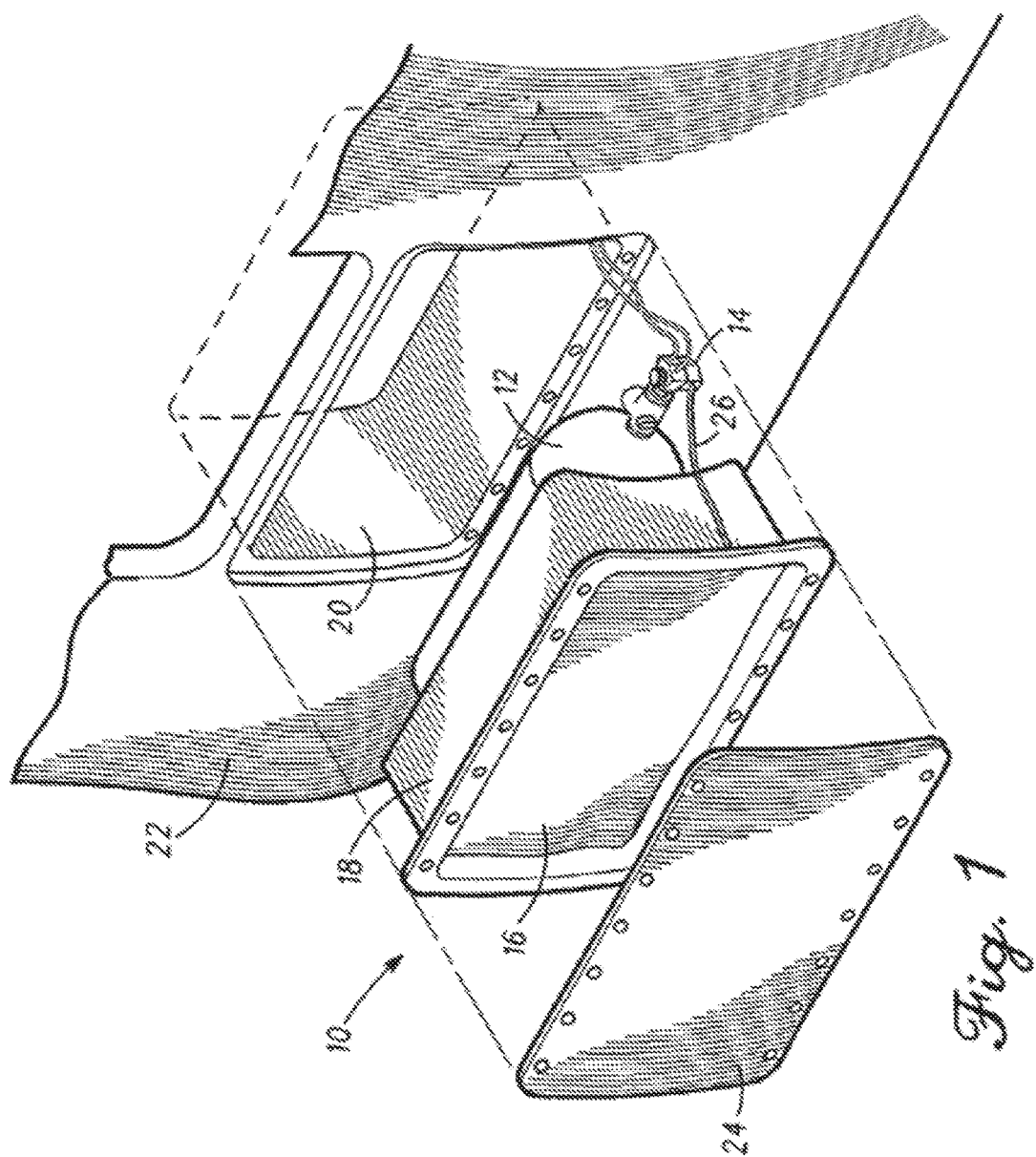
FIG. 1 is a schematic diagram of inflatable aircraft evacuation slide system.

With reference now to FIG. 1, an example of an inflatable aircraft evacuation slide system 10 is illustrated. The inflatable aircraft evacuation slide system 10 includes one or more pressure vessels 12 ccontaining pressurized inflation gas, a control valve 14 and an inflatable evacuation slide 16 stored in an uninflated condition within a packboard compartment 18. The packboard compartment 18 is secured within a recess 20 in the outer hull of the aircraft 22 and covered by a cover panel 24. Pressure vessel 12 further includes a pyrotechnic gas generator (not shown) that heats and augments the stored inflation gas within pressure vessel 12. In normal operation, the opening of the aircraft emergency evacuation exit door in the armed condition causes the control valve 14 to open allowing inflation gas to flow from pressure vessel 12 into inflation line 26 to operate the locks allowing cover panel 24 to fall away and to inflate inflatable evacuation slide 16. Simultaneously, the gas generator is initiated to augment and heat the stored inflation gas flowing out of pressure vessel 12. As noted hereinbefore, when evacuation slide system 10 is initiated at an elevated temperature, substantial excess inflation gas is produced due to the combined thermal effects of the ambient temperature and the pyrotechnic gas generator. Accordingly, in addition to functioning as the primary valve between the source of inflation gas and the inflatable evacuation slide, control valve 14 further acts to vent the appropriate portion of the excess inflation gas as more fully described hereinafter.

Figure 2:
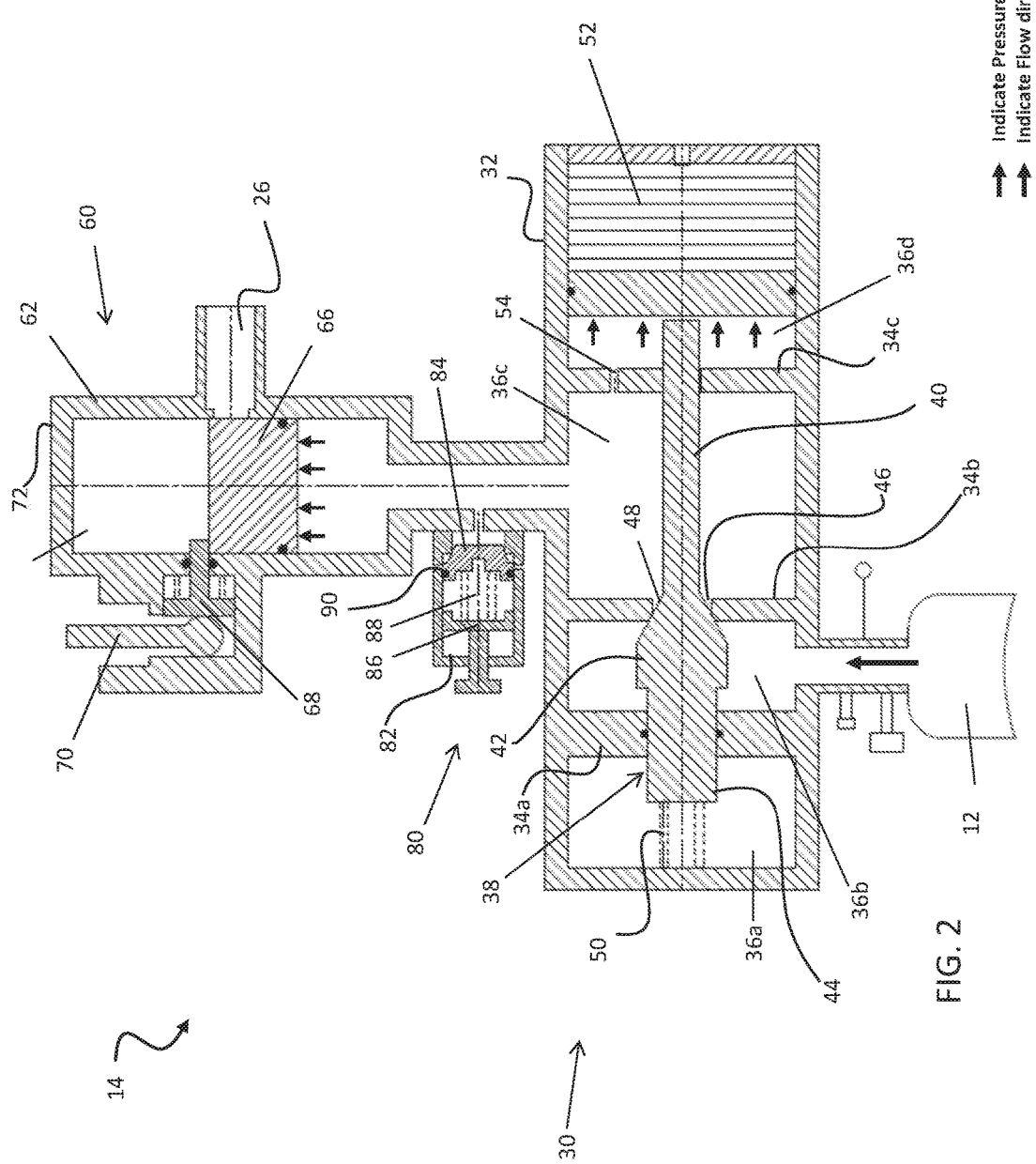
FIG. 2 is a cross-sectional view of the control valve of the inflatable aircraft evacuation slide system of FIG. 1 in a closed position according to an embodiment.
Figure 3:
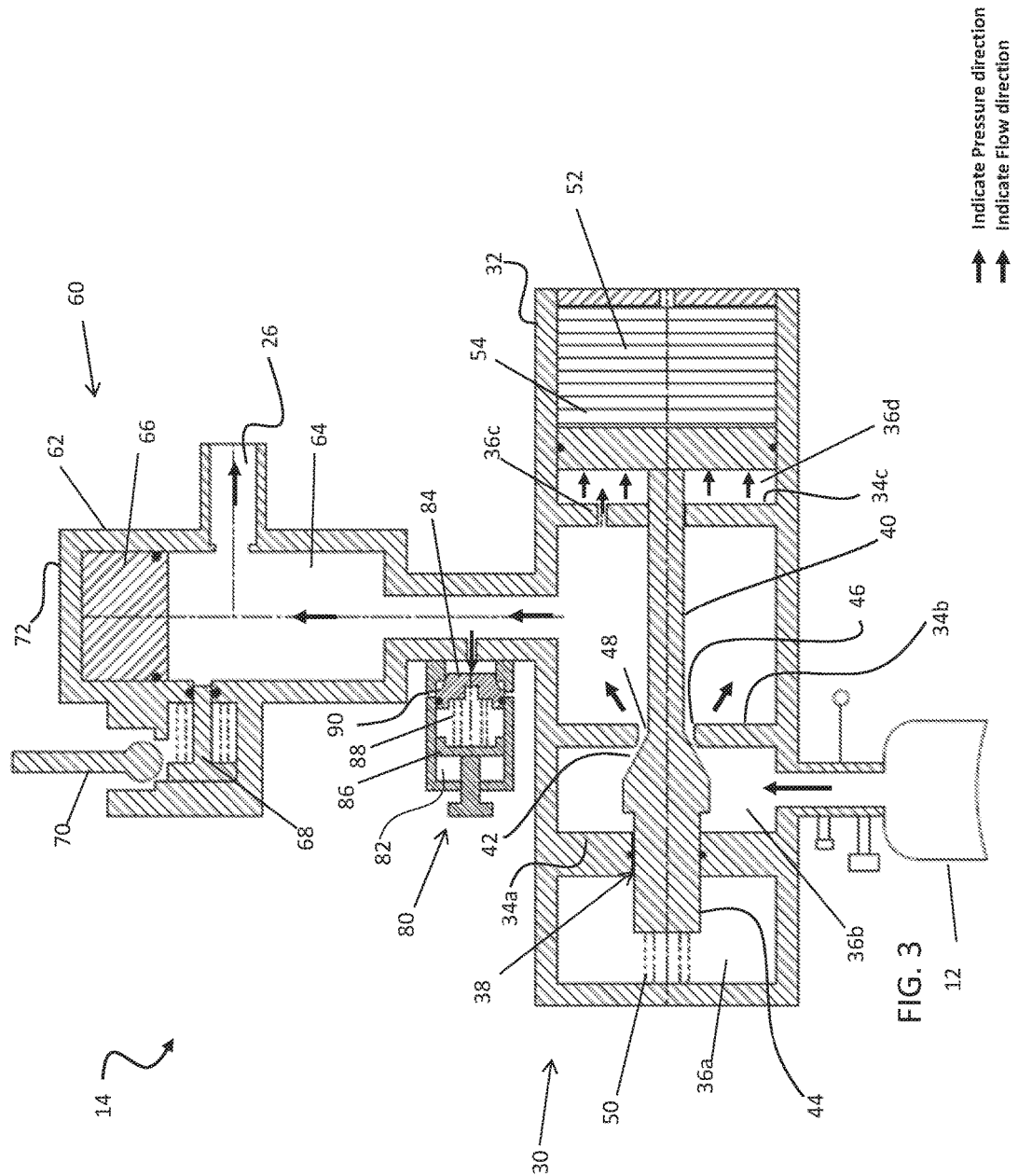
FIG. 3 is a cross-sectional view of the control valve of the inflatable aircraft evacuation slide system of FIG. 1 in an open position according to an embodiment.
Figure 4:
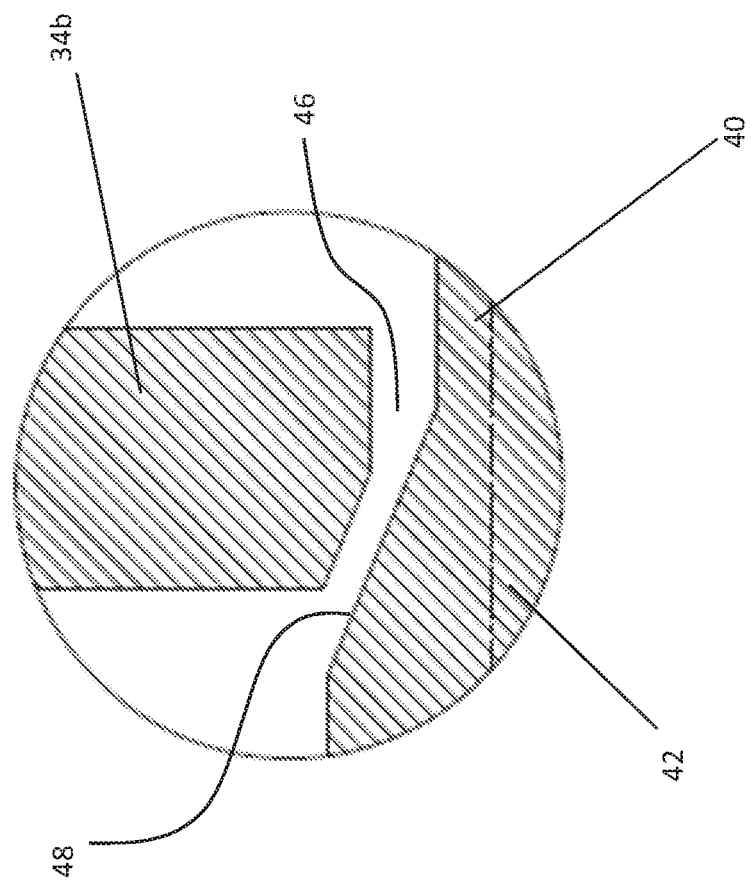
FIG. 4 is a detailed view of the flow metering opening of the control valve assembly when the control valve is in an open position according to an embodiment.

Referring now to FIGS. 2 and 3, an example of the control valve 14 according to an embodiment is illustrated in more detail. The control valve 14 includes an upstream pressure regulator 30 arranged in fluid communication with a downstream slide valve 60. The pressure regulator 30 includes a housing 32 having at least one internal wall 34 configured to define a plurality of chambers 36 therein. A flow metering element 38 having a nose 40, body 42, and tail 44 is arranged within the housing 32 and extends at least partially through the internal walls 34 into each of the plurality of chambers 36. In the illustrated, non-limiting embodiment, the tail 44 of the flow metering element 38 extends through a complementary opening (not shown) in a first internal wall 34a such that at least a portion of the tail 44 is arranged within a first chamber 36a of the housing 32. A seal may be positioned about the tail 44 within the opening to prevent the transmission of pressure and/or fluid to the first chamber 36a. The body 42 of the flow metering element 38 is arranged within a second chamber 36b defined between the first internal wall 34a and a second internal wall 34b. A portion of the flow metering element 38 extends through an opening 46, shown in FIG. 4, in the second internal wall 34b such that the nose 40 extends through a complementary opening (not shown) in a third internal wall 34c and is positioned within both a third 36c and fourth chamber 36d of the housing 32.

As shown, a diameter of the body 42 of the flow metering element 38 adjacent the nose 40 increases in a direction towards the tail 44, such that a portion of the body 42 has a generally angled surface 48. In one embodiment, the opening 46 formed in the second internal wall 34b is larger than a diameter of the nose 40, but smaller than the maximum diameter of the body 42. Similarly, the opening formed in the first internal wall 34a is smaller than the diameter of the adjacent portion of the body 42. As a result, movement of the flow metering element 38 within the housing 32 is restricted by engagement of the body 42 with the first internal wall 34a and the second internal wall 34b and third internal wall 34c. In one embodiment, the chamber 36b within which the body 42 is positioned is fluidly connected to the pressure vessel 12.

A first biasing mechanism 50 is arranged in contact with the tail of the flow metering element 38. The first biasing mechanism 50 is configured to bias the flow metering element 38 in a first direction to a "closed position" where the angled surface 48 of the body 42 is arranged in contact with the second internal wall 34b. A second biasing mechanism 52 is arranged within the fourth chamber 36d and extends in a direction towards the nose 40 of the flow metering element 38. When the valve 14 is closed, as shown in FIG. 2, the second biasing mechanism 52 is separated from, and therefore not in contact with the nose 40. In the illustrated, non-limiting embodiment, the second biasing mechanism 52 includes one or more Belleville washers having a piston mounted to a free end thereof. A seal may be arranged between a periphery of the piston and the housing 32 to prevent fluid and pressure flow there behind. However, it should be understood that any type of biasing mechanism, such as a coil spring or torsion spring for example, is within the scope of the disclosure.

In one embodiment, the third chamber 36c is fluidly coupled to the slide valve 60. An orifice 54 formed in the third internal wall 34c is configured to allow communication between the third and fourth chambers 36c, 36d. As a result of this orifice 54, pressure within the third chamber 36c is transmitted to the fourth chamber 36d, and therefore applied to the second biasing mechanism 52, in a direction opposite its biasing force.

The slide valve 60 includes a housing 62 having a channel 64 within which a piston 66 movable between a first position (FIG. 2) and a second position (FIG. 3) is located. The housing 62 of the slide valve 60 may be integrally formed with, or alternatively, may be coupled to the housing 32 of the pressure regulator 30. When the valve 14 is inactive, a latching pin 68 operably coupled to a cable 70 extends through the housing 62 into the channel 64 to restrict movement of the piston 66. The latching pin 68 is arranged to block communication between the channel 64 and the inflation line 26 extending from the channel 64 to the inflatable evacuation slide 16. Operation of the cable 70, either automatically or manually, is configured to move the latching pin 68 to a recessed position (FIG. 3), thereby allowing the piston 66 to move to a second position and, such as in contact with an end 72 of the housing 62 for example, such that the channel 64 and the inflation lien 26 are fluidly coupled. A seal may be positioned about the latching pin as shown in (FIG. 3) to prevent the flow of inflation gas from channel 64 to cable area.

Arranged in fluid communication with the slide valve 60, upstream from the channel 64 and downstream from the connection with the pressure regulator 30 is a pressure relief valve 80. Arranged within a housing 82 is a movable member 84 connected to a fixed member 86 via a biasing mechanism 88. Formed within the housing 82 is at least one relief opening 90. When the movable member 84 is in a default position, as shown in FIG. 2, the movable member 84 is positioned such that the outlet of the pressure regulator 30 and the relief opening 90 are not in fluid communication. When the pressure within the control valve 14 exceeds a threshold, the force exerted by the pressure on the movable member 84 causes the biasing mechanism 88 to compress and the movable member 84 to slide relative to the housing 82, thereby arranging the relief opening 90 and the slide valve 60 in fluid communication. A seal may be positioned about the moveable member 84 to prevent the gas flow going into the cavity containing the biasing mechanism 88. Inclusion of the pressure relief valve 80 is intended to provide an outlet for increased pressure in the channel when the valve is closed 14, such as due to leakage from the at least one pressure vessel 12 or malfunction of the pressure regulator 30, to prevent unintended deployment of the evacuation slide 16 in-flight.

During the initial setting, or resetting of the valve 14, such as after deployment of an evacuation slide 16 for example, the flow metering element 38 is at a maximum open position, with the body 42 arranged in contact with the first internal wall 34a, and the slide 66 of the slide valve 60 being retained in a first position by latch 68. As an initial pressure charge is provided to the second chamber 36b from the pressure vessel 12, a force is applied to the second biasing mechanism 52, opposite its bias. Simultaneously, the biasing force from biasing mechanism 50 causes the flow metering element 38 to move to the closed position shown in FIG. 2, such that the angled surface of the body 42 is arranged in contact with the internal wall 34*b*. In this closed position, pressure is trapped between the internal wall 34*b* sealed by the flow metering element 38 and the second biasing mechanism 52. Pressure is additionally trapped in the channel 64 of the slide valve 60. The pressure forces act on the slide 66 of slide valve and the moving element 84 of the pressure relief valve 80. The movement of slide 66 is prevented by the latch pin 68 and movement of moving element 84 is prevented by the biasing mechanism 88.

Upon actuation of the cable 70, the slide valve moves to the second position, thereby allowing the trapped pressure to flow through the channel 64 to the inflation line 26. By releasing this trapped pressure, the biasing force of the second biasing mechanism 52 causes the second biasing mechanism to apply a force to the nose 40 of the flow metering element 38 such that the body 42 moves out of contact with the internal wall 34*b*. This movement of the flow metering element 38 creates a fluid passageway that allows fluid communication between the second chamber 36*b* and the channel 64. This small size of the fluid passageway between the angled surface 48 and the opening 46 reduces the pressure of the flow before it is provided to the inflation line 26.

The control valve described herein provides more robust flow control compared to conventional inflation systems because movement of the flow metering element 38 within the pressure regulator 30 is dependent on the downstream pressure variation within the slide valve 60 and upstream pressure variation within pressure vessel 12. In addition, the flow area between the angled surface 48 and the opening 46 and the biasing forces of the first and second biasing mechanisms 50, 52 may be adjusted to achieve a desired flowrate dependent on the application.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A control valve, comprising:
   a slide valve including a slide movable within a channel between a first position and a second position, wherein when the slide is in the second position, the channel is arranged in fluid communication with an outlet line, the slide configured for movement from the first position to the second position by fluid pressure in the channel;
   a pressure regulator arranged upstream from and in fluid communication with the slide valve and operably coupled to a pressure vessel of pressurized inflation gas, the pressure regulator including a flow metering element movable between an open position and a closed position to regulate a flow of fluid and pressure through the control valve in response to a pressure variations within the downstream slide valve;
   wherein when the flow metering element is in the opened position pressurized inflation gas is directed from the pressure vessel, through the pressure regulator and to the slide valve; and
   wherein when the slide valve is in the second position the pressurized inflation gas flows from the slide valve into the outlet line for inflation of an inflatable evacuation slide.

2. The control valve according to claim 1, wherein a movable pin extends into the channel to restrict movement of the slide from the first position.

3. The control valve according to claim 2, wherein operation of the control valve via movement of the movable pin is initiated manually.

4. The control valve according to claim 2, wherein operation of the control valve via movement of the movable pin is initiated automatically.

5. The control valve according to claim 1, wherein a first biasing mechanism biases the flow metering element into the closed position.

6. The control valve according to claim 5, wherein movement of the slide from the first position to the second position reduces a pressure within the pressure regulator.

7. The control valve according to claim 6, further comprising a second biasing mechanism arranged adjacent an end of the flow metering element within the pressure regulator, wherein when the flow metering element is in the closed position, the second biasing mechanism is not in contact with the flow metering element.

8. The control valve according to claim 7, wherein the second biasing mechanism is configured to bias the flow metering element into the open position in response to a pressure drop.

9. The control valve according to claim 8, wherein the pressure drop occurs as a result of fluid communication between the channel of the slide valve and the outlet line.

10. The control valve according to claim 1, wherein the flow metering element extends through an opening formed in an internal wall of the pressure regulator, and a clearance between the flow metering element and the internal wall regulates a fluid and pressure flows through the opening.

11. The control valve according to claim 10, wherein the portion of the flow metering element adjacent the internal wall includes an angled surface such that the fluid and pressure flow through the opening varies based on the position of the flow metering element.

12. The control valve according to claim 11, wherein when the flow metering element is in the closed position, the angled surface is in contact with the internal wall to block fluid and pressure flow through the opening.

13. The control valve assembly according to claim 1, further comprising a relief valve arranged in fluid communication with the slide valve.

14. The control valve assembly according to claim 13, wherein the relief valve is configured to discharge fluid to maintain a pressure within the control valve when the flow metering element is in the closed position.

15. The control valve assembly according to claim 13, wherein the relief valve is configured to discharge excess pressure if the pressure regulator malfunctions.

16. The control valve assembly according to claim 1, wherein the fluid source includes at least one pressure vessel.

17. The control valve assembly according to claim 1, wherein the control valve assembly is part of an aircraft evacuation slide inflation system.

18. An aircraft evacuation slide inflation system, comprising:
   an inflatable evacuation slide stored in an undeployed position;

a source of inflation gas for inflating said inflatable evacuation slide; and a control valve including:

a slide valve including a slide movable within a channel between a first position and a second position, wherein when the slide is in the second position, the channel is arranged in fluid communication with an outlet line, the slide configured for movement from the first position to the second position by fluid pressure in the channel;

a pressure regulator arranged upstream from in fluid communication with the slide valve and operably coupled to the source of inflation gas, the pressure regulator including a flow metering element movable between an open position and a closed position to regulate a flow of fluid and pressure through the control valve in response to a pressure variations within the downstream slide valve;

wherein when the flow metering element is in the opened position, pressurized inflation gas is directed from the pressure vessel, through the pressure regulator and to the slide valve; and wherein when the slide valve in the second position the pressurized inflation gas flows from the slide valve into the outlet line for inflation of an inflatable evacuation slide.

* * * * *